United States Patent [19]

Giulie

[11] 4,172,750
[45] Oct. 30, 1979

[54] SMALL MANUAL LAMINATING SYSTEM

[75] Inventor: Joe D. Giulie, Palo Alto, Calif.

[73] Assignee: General Binding Corporation, Northbrook, Ill.

[21] Appl. No.: 920,371

[22] Filed: Jun. 29, 1978

Related U.S. Application Data

[63] Continuation of Ser. No. 784,666, Apr. 5, 1977, abandoned.

[51] Int. Cl.² ............... B30B 3/04; B30B 15/34; B32B 31/20
[52] U.S. Cl. .................... 156/267; 100/93 P; 100/93 RP; 100/137; 100/233; 156/250; 156/344; 156/366; 156/583.1; 428/916; 156/309; 156/367
[58] Field of Search ............ 156/366, 555, 582, 583, 156/300, 306, 309, 250, 344, 267; 100/93 P, 93 RP, 38, 49, 51, 137, 210, 218, 233; 283/7; 40/2.2; 428/916

[56] References Cited

U.S. PATENT DOCUMENTS

| | | | |
|---|---|---|---|
| 2,766,810 | 10/1956 | Gibson | 156/366 |
| 3,005,483 | 10/1961 | Middents et al. | 156/583 |
| 3,139,816 | 7/1964 | Jemison et al. | 100/93 P |
| 3,149,560 | 9/1964 | Finke | 100/93 P |
| 3,450,031 | 6/1969 | Peterson | 100/233 |
| 3,520,756 | 7/1970 | Denaro et al. | 156/322 |
| 3,655,487 | 4/1972 | Farkas | 156/583 X |
| 3,666,603 | 5/1972 | Kuhns et al. | 156/583 |
| 3,770,550 | 11/1973 | Levitan | 156/555 X |
| 3,830,681 | 8/1974 | Wilson | 156/583 |
| 3,874,979 | 4/1975 | Hannon | 428/916 X |
| 3,943,031 | 3/1976 | Krueger et al. | 156/306 X |
| 4,021,288 | 5/1977 | Hannon et al. | 100/93 RP X |

Primary Examiner—Michael G. Wityshyn
Attorney, Agent, or Firm—Hill, Van Santen, Steadman, Chiara & Simpson

[57] ABSTRACT

This invention relates to a small laminating machine which is primarily designed to laminate identification cards and the like with heat sealable packets of a special configuration. The packets to be used with the machine consist preferably of two sheets of Mylar film coated with polyethylene on the facing sides and attached to a tear-off tab.

10 Claims, 5 Drawing Figures

SMALL MANUAL LAMINATING SYSTEM

This is a continuation, of application Ser. No. 784,666, filed Apr. 5, 1977, now abandoned.

SUMMARY OF THE INVENTION

Laminating machines for ID cards are well known and ordinarily require a special carrier to encase the packet during the laminating process. This carrier is typically a cardboard folder coated with silicon so that it will not stick. These laminating machines require a relatively long warm-up time of from 4 to 15 minutes even if only one card is to be laminated and require a motor to drive the carrier through the machine. The carrier is awkward to load and unload and requires a long cooling time; heat is trapped by the cardboard carrier which must not be opened until the packet is cool or damage may occur.

The laminating machine of the present invention requires no warm-up time, no motor, and thus is simple and inexpensive so that almost any office or other installation can afford to have one. It also makes the cooling period very short.

Still a further object of the present invention is to provide a laminating machine which will accomodate pre-fabricated packets with a tear-off tab wherein the tab is not contained within the heating elements and provides an easy means for pulling the packet through the pressure rollers and out of the machine as a completed packet.

Although the machine of the present invention relates primarily to the laminating of ID cards and the like, larger version are useful for laminating documents of any size.

Other features and advantages of the present invention will be brought out in the balance of the specification.

DESCRIPTION OF THE PREFERRED EMBODIMENTS

Figure 1:
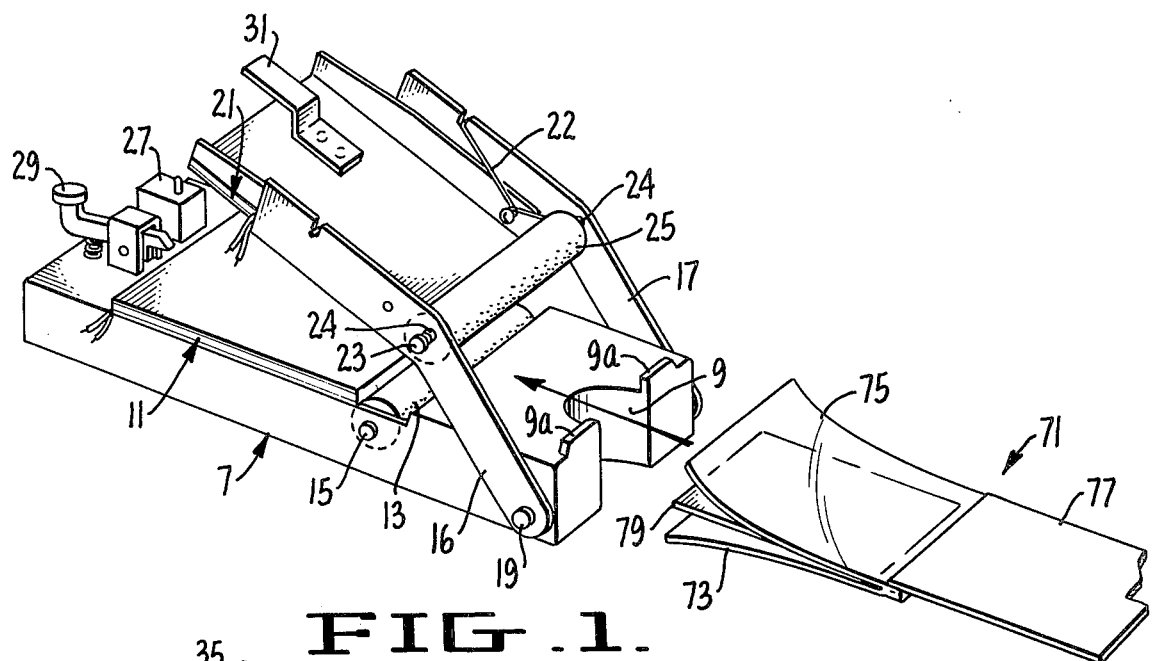
FIG. 1 is a perspective view of a heat sealing machine embodying the present invention showing the machine in the open position and with the cover removed.

The machine of the present invention is mounted on a base 7 of generally rectangular configuration with a semi circular cutout 9 at one end thereof to allow easy grip of the tab. Mounted on the base is the lower heating platen 11, described in detail hereinafter, and the lower pressure roller 13 as well as tab alignment stops 9a. The pressure roller 13 is mounted on shaft 15 so that it can rotate freely. Roller 13 is covered with a resilient temperature resistant material such as polyurethane.

Figure 2:
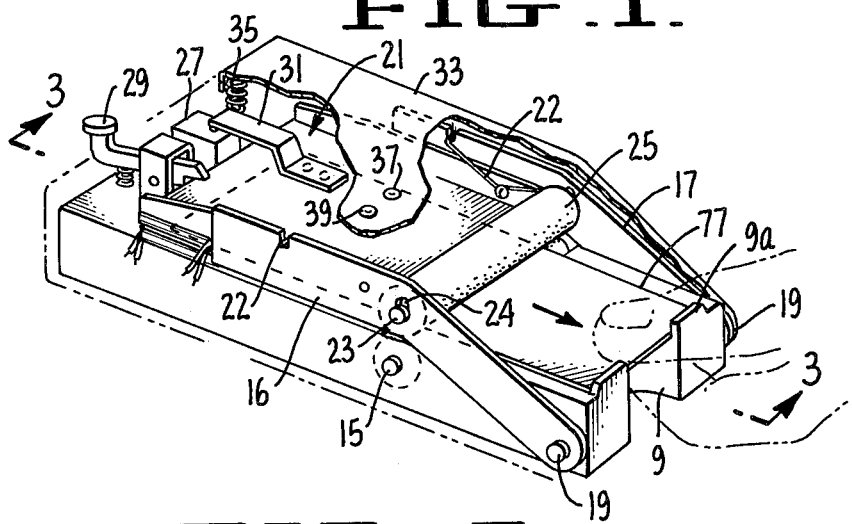
FIG. 2 is a view similar to FIG. 1 showing the position of the parts while a sealing operation is taking place and with a portion of the cover broken away.
Figure 3:
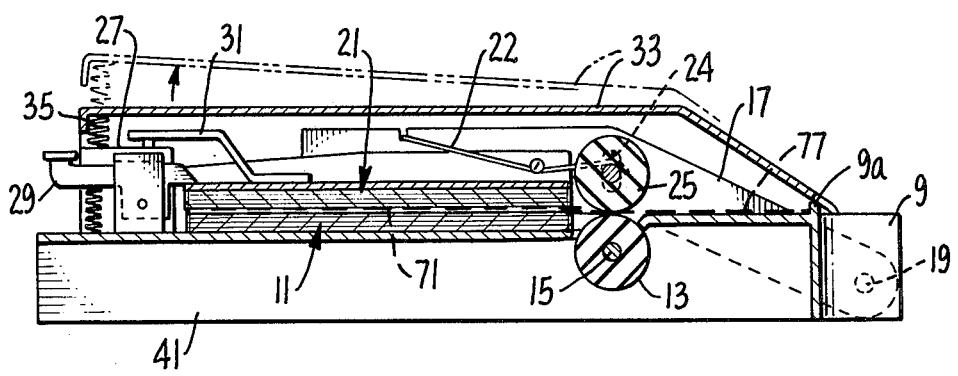
FIG. 3 is a section on the line 3—3 of FIG. 2 and also shows the cover assembly and opening spring employed in a practical embodiment of the machine.
Figure 4:
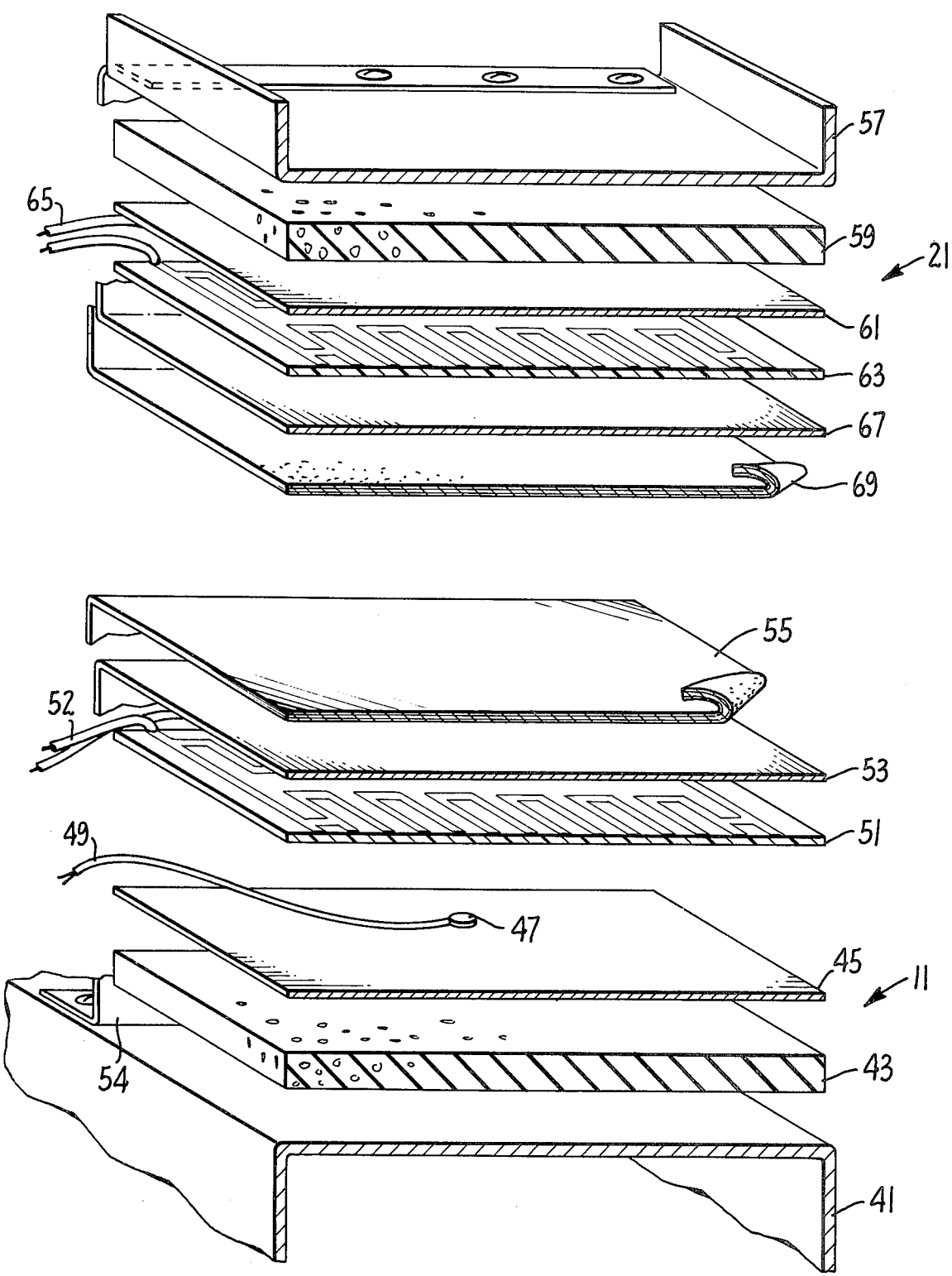
FIG. 4 is an exploded view of the upper and lower laminating platens.

Arms 16 and 17 are pivoted near the front of the machine on shaft 19. The upper platen, generally designated 21, is mounted on arms 16 and 17 which pivot at 19 to allow upper platen to move upward thus opening both the pressure rollers and the heaters for insertion of the packet. Shaft 23 mounted in slots 24 serves as the mounting for the upper pressure roller 25 which has a structure similar to roller 13. Springs 22 act to bias shaft 23 to the bottom of slots 24 and when the arms are in the down position as shown in FIG. 2 press roller 25 against the lower roller 13 with sufficient pressure to cause the melted coating, e.g. polyethylene, on the inside surfaces of the packet to seal the material being laminated. A SPDT microswitch 27 and a latch 29 are also mounted on the base 7. Arm 31 extends from the upper platen so that it will contact microswitch 27 when in the down position. A cover member 33 is attached to the arms 15 and 17 and spring 35 normally biases the cover in the up position so that when the latch is released the entire upper assembly opens which allows insertion of the packet. Two indicator lights 37 and 39 are also mounted on cover 33, the function of which will be later explained.

The upper and lower platen are essentially the same except that the lower platen contains a heat sensing element such as a thermister. Thus, the lower platen has a metal, e.g. aluminum frame 41 and over this is a pad from a soft material such as foam silicon rubber 43 and over this is a thin aluminum sheet 45. A heat sensing element such as thermister 47 having suitable connecting wires 49 overlies the metal sheet and over this is a printed circuit heater element 51 having connecting wires 52. Over this is a stainless steel sheet 53 having an outer covering consisting of a thin, non-stick layer 55 of a flurocarbon such as Teflon. The upper platen is of similar structure consisting of frame 57, resilient pad 59, aluminum sheet 61 and a printed circuit heater 63 having connecting wires 65. Stainless steel sheets 67 and a Teflon layer 69 complete the structure.

Figure 5:
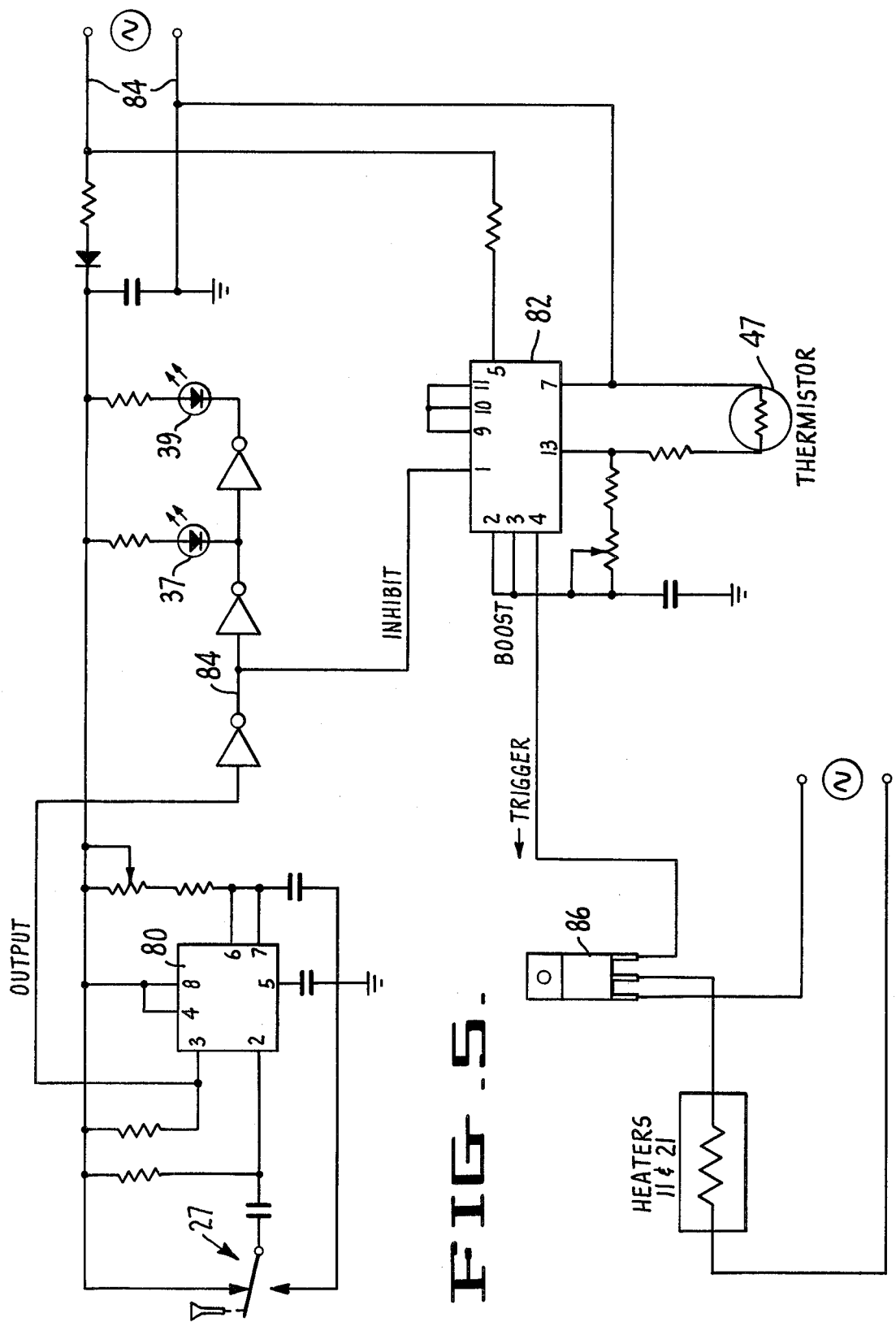
FIG. 5 is a block diagram of the electronic circuitry employed with the laminating device of the present invention.

The control circuitry is shown in FIG. 5 and consists of the following parts:

The circuit diagram of a suitable control circuit is shown in FIG. 5. This circuit employs a one-shot multivibrator 80 and a timer circuit 82 which can suitably be an NE 555 and RCA CA 3059 respectively. When the device is first plugged in through lines 84, switch 27 is in the position as shown and line 84 is low which causes the green LED 37 to glow. This indicates to the operator that the machine is ready for a laminating operation. After a laminating packet has been put in place and the cover closed, switch 27 is switched to the lower contact which causes line 84 to go high which causes the red LED 39 to go on and the green LED 37 to go off. At this time, timer circuit 82 is activated causing SCR 86 to turn on the heaters 11 and 21. As heating continues, thermister 47 will cause the heaters to be turned on and off to maintain a proper temperature. When a sufficient amount of time has elapsed, timer 82 will turn off heaters 11 and 21 and will cause the red LED 39 to go off and the green LED 37 go on, indicating to the user that the laminating operation is now complete and the packet can be pulled through the rollers to complete the laminating operation. The machine is now in standby, ready for a repetition of the laminating cycle.

A laminating packet suitable for use with the machine of the present invention consists of an upper sheet 73 and a lower sheet 75 preferably of Mylar plastic with a polyethylene coating on the inside surfaces and with a tear-off tab 77 at one end thereof; the tab may be attached directly to the packet or connected by a thin heat sealable strip (not illustrated). The material to be laminated designated 79 is placed between the sheets 73 and 75 and the packet is inserted in the machine with the heat sensitive sheets 73 and 75 between the platens 11 and 21 and with the tab 77 between rollers 25 and 13 and overlying notch 9 with its edge against stops 9a. The cover is now brought down so that the latch 29 engages the top platen and arm 31 closes microswitch 27 which turns on the heater and the timing circuit. When the light 37 goes on, it indicates that the packet has been in the device for a sufficient length of time to melt the inner surface of the plastic sheets. One now grasps the tab 77, as is shown in phantom in FIG. 2 and pulls the packet out between the rollers 13 and 25. These rollers put pressure on the packet and complete the heat sealing operation. One can now tear the paper tab 77 from the packet leaving the heat sealed article.

Because of the temperature control circuitry employed, the device can be left on for extended periods of time and it will not overheat. At any time the cover can be released by pressing on the lever 29 for a repetition of the operation.

Many variations can be made in the device illustrated without departing from the spirit of this invention. For instance, instead of being hinged at the end, the upper platen could be hinged at the side to allow pages in a booklet, such as passport, to be laminated.

I claim:

1. A machine for laminating packets wherein said packet includes a pair of heat sealable sheets joined along one marginal edge with a tear off tab extending beyond said sheets from said marginal edge, comprising in combination:
   (a) a flat base member having a gap therein;
   (b) a first flat heating element mounted on one end of said base with a marginal edge lying along one marginal edge of said gap leaving a free end of said base beyond said gap;
   (c) a first roller mounted for free rotation in said gap with its upper edge lying in the plane of said first flat heating element;
   (d) a carriage having mounted thereon a second flat heating element and a second roller, said second flat heating element lying directly over said first flat heating element and said second roller lying directly over said first roller;
   (e) means for moving said carriage away from said base to permit a laminating packet to be placed therebetween with the heat sealable sheets lying between said heating elements and with a portion of the packet lying between said rollers;
   (f) means for bringing said carriage toward said base whereby said heat sealable sheets will be held between said first and second heating elements and said first and second rollers will grip said packet in a region of said marginal edge with said tear-off tab lying on the free end of said base.

2. The machine of claim 1 wherein said carriage includes a pair of arms pivoted near one end of said base and a latch for holding said carriage against said base.

3. The machine of claim 2 including a switch wherein said arms have means thereon for actuating said switch when said arms are brought adjacent said base, said switch actuating said first and second heating elements.

4. The machine of claim 3 having a timing means therein and wherein said switch actuates said timing mechanism.

5. The machine of claim 1 wherein each heating element includes a flat plate with a non-stick fluorocarbon coating thereon.

6. The machine of claim 1 wherein said base includes at least one locating member whereby a packet can be accurately positioned on said base.

7. A machine for laminating packets wherein said packet includes a pair of heat sealable sheets joined along one marginal edge with a tear off tab extending beyond said sheets from said marginal edge, comprising in combination:
   (a) a base member;
   (b) a first heating element mounted on said base member;
   (c) a first roller mounted for free rotation and without automatic drive at one end of said heating element on said base member;
   (d) a carriage having mounted thereon a second heating element and a second roller mounted for free rotation and without automatic drive, said second heating element lying over said first heating element and said second roller lying over said first roller;
   (e) means for moving said carriage away from said base a distance sufficient to permit a laminating packet to be manually placed by a user such that the heat sealable sheets lie between said heating elements and the tab of the packet lies between said rollers;
   (f) means for bringing said carriage toward said base such that said heat sealable sheets will be held between said first and second heating elements and said first and second rollers will grip said tear-off tab; and
   (g) access means for permitting the user to manually grab said tab.

8. The machine of claim 7 wherein said access means comprises a tab receiving portion of the base adjacent the rollers and opposite the heating elements.

9. A machine for laminating packets wherein said packet includes a pair of heat sealable sheets joined along one marginal edge and a finger gripping means associated with the packet, a portion of which extends beyond said sheets with respect to said marginal edge, comprising in combination:
   (a) a base member having access means for the finger gripping means;
   (b) a first heating element mounted on said base member;
   (c) a first roller mounted for free rotation and without automatic drive at one end of said heating element on said base member;
   (d) a carriage having mounted thereon a second heating element and a second roller mounted for free rotation without automatic drive, said second heating element lying over said first heating element and said second roller lying over said first roller;
   (e) means for moving said carriage away from said base a distance sufficient to permit a laminating packet to be manually placed such that the heat sealable sheets lie between said heating elements and the finger gripping means lies adjacent the rollers opposite the heating elements;
   (f) means for bringing said carriage toward said base such that said heat sealable sheets will be held between said first and second heating elements and said first and second rollers will grip said packet adjacent said marginal edge, and said finger gripping means being positioned at said access means.

10. A method for manually laminating packets, comprising the steps of:

(a) providing a laminating packet having a pair of heat sealable sheets joined along one marginal edge and a finger gripping means releasably associated with the laminating packet with a portion of said finger gripping means extending beyond the sheets of the packet with respect to said marginal edge, an article to be laminated being positioned between the sheets;

(b) providing a manually operated laminator having first and second laminating plates and first and second rollers adjacent the laminating plates, the first laminator plate and first roller being movable between a closed position with the first laminating plate adjacent the second laminating plate and the first roller adjacent the second roller and an open position with the first laminating plate and first roller spaced from the second laminating plate and second roller;

(c) placing the first plate and first roller in the open position and inserting therein the laminating packet;

(d) placing the first plate and first roller in the closed position such that the heat sealable sheets are between the first and second plates and the finger gripping means extends between the first and second rollers;

(e) heating the laminating packet while between the closed laminating plates;

(f) manually pulling the finger gripping means so as to pull the laminating packet through the rollers so as to manually rotate said rollers after the packet has been heated for a time sufficient to seal the article between the pair of heat sealable sheets; and (g) removing the finger gripping means from the packet.

* * * * *